United States Patent
Wu

(10) Patent No.: US 10,878,054 B2
(45) Date of Patent: Dec. 29, 2020

(54) DATA PROCESSING METHOD AND APPARATUS

(71) Applicant: ADVANCED NEW TECHNOLOGIES CO., LTD., Grand Cayman (KY)

(72) Inventor: Shaoyun Wu, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/260,849

(22) Filed: Jan. 29, 2019

(65) Prior Publication Data

US 2019/0155866 A1 May 23, 2019

Related U.S. Application Data

(63) Continuation of application No. PCT/CN2017/093775, filed on Jul. 21, 2017.

(30) Foreign Application Priority Data

Aug. 4, 2016 (CN) .......................... 2016 1 0630555

(51) Int. Cl.
*G06F 17/20* (2006.01)
*G06F 16/955* (2019.01)
*G06F 16/00* (2019.01)
*G06F 16/957* (2019.01)
(Continued)

(52) U.S. Cl.
CPC .......... *G06F 16/9558* (2019.01); *G06F 16/00* (2019.01); *G06F 16/9024* (2019.01); *G06F 16/954* (2019.01); *G06F 16/9574* (2019.01)

(58) Field of Classification Search
None
See application file for complete search history.

(56) References Cited

U.S. PATENT DOCUMENTS

| 6,421,675 B1 | 7/2002 | Ryan et al. |
| 7,143,091 B2 | 11/2006 | Charnock et al. |
| 7,155,157 B2 | 12/2006 | Kaplan |

(Continued)

FOREIGN PATENT DOCUMENTS

| CN | 101504648 A | 8/2009 |
| CN | 102467541 A | 5/2012 |

(Continued)

OTHER PUBLICATIONS

First Office Action of Chinese Application No. 201610630555.3 dated Dec. 2, 2019, (12 Pages).

(Continued)

*Primary Examiner* — Shahid K Khan

(57) ABSTRACT

A data processing method includes receiving, from a client, a link request associated with a link in an online article, where the link request includes a matter name corresponding to a matter described in the article and a publishing time of the article. The method also includes obtaining a trend chart corresponding to the matter name, where the trend chart includes data associated with the publishing time, annotating information associated with the publishing time in the trend chart, and sending the annotated trend chart to the client for display.

18 Claims, 4 Drawing Sheets

(51) Int. Cl.
*G06F 16/954* (2019.01)
*G06F 16/901* (2019.01)

(56) References Cited

U.S. PATENT DOCUMENTS

| | | | |
|---|---|---|---|
| 7,502,770 B2 | 3/2009 | Hillis et al. | |
| 7,624,337 B2 | 11/2009 | Sull et al. | |
| 7,720,835 B2 | 5/2010 | Ward et al. | |
| 7,761,436 B2 | 7/2010 | Norton et al. | |
| 7,765,481 B2 | 7/2010 | Dixon et al. | |
| 7,822,620 B2 | 10/2010 | Dixon et al. | |
| 7,921,097 B1* | 4/2011 | Dandekar | G06F 16/9566 707/707 |
| 8,150,842 B2 | 4/2012 | Brougher et al. | |
| 8,423,424 B2 | 4/2013 | Myslinski | |
| 8,438,499 B2 | 5/2013 | Dixon et al. | |
| 8,458,046 B2 | 6/2013 | Myslinski | |
| 8,756,224 B2 | 6/2014 | Dassa et al. | |
| 9,069,872 B2 | 6/2015 | Adar et al. | |
| 9,323,826 B2 | 4/2016 | Bailey et al. | |
| 9,760,547 B1 | 9/2017 | Brougher et al. | |
| 2001/0047397 A1* | 11/2001 | Jameson | G06F 16/9577 709/217 |
| 2007/0203816 A1* | 8/2007 | Costache | G06Q 40/00 705/35 |
| 2008/0065737 A1* | 3/2008 | Burke | G06F 16/437 709/217 |
| 2008/0109619 A1* | 5/2008 | Nakanishi | G06F 11/1469 711/159 |
| 2008/0155037 A1 | 6/2008 | Sohoni | |
| 2008/0288476 A1 | 11/2008 | Kim et al. | |
| 2010/0106599 A1* | 4/2010 | Kohn | G06Q 10/0637 705/14.54 |
| 2010/0306129 A1* | 12/2010 | Dayanim | G06Q 40/04 705/36 R |
| 2011/0040644 A1* | 2/2011 | Juda | G06F 40/169 705/26.3 |
| 2011/0202828 A1 | 8/2011 | Wan | |
| 2011/0246388 A1* | 10/2011 | Zhang | G06Q 40/06 705/36 R |
| 2011/0246412 A1* | 10/2011 | Skelton | G06Q 30/0202 706/52 |
| 2011/0320437 A1 | 12/2011 | Kim et al. | |
| 2013/0138577 A1* | 5/2013 | Sisk | G06Q 40/04 705/36 R |
| 2014/0122622 A1 | 5/2014 | Casteria | |
| 2015/0371329 A1* | 12/2015 | Davies | G06Q 40/04 705/37 |
| 2016/0092941 A1 | 3/2016 | Sakai | |
| 2019/0155866 A1 | 5/2019 | Wu | |

FOREIGN PATENT DOCUMENTS

| | | |
|---|---|---|
| CN | 102609877 A | 7/2012 |
| CN | 102880985 A | 1/2013 |
| CN | 102906744 A | 1/2013 |
| CN | 104423779 A | 3/2015 |
| CN | 104571862 A | 4/2015 |
| CN | 104732567 A | 6/2015 |
| CN | 106897346 A | 6/2017 |
| JP | 1998-320469 A | 12/1998 |
| JP | 2003-108785 A | 4/2003 |
| JP | 2010-073076 A | 4/2010 |
| TW | 200949744 A | 12/2009 |
| TW | 201013572 A | 4/2010 |
| TW | 201502824 A | 1/2015 |

OTHER PUBLICATIONS

First Search of Chinese Application No. 2016106305553 dated Nov. 21, 2019, (12 Pages).
Search Report for European Application No. 17836297.6 dated Dec. 2, 2019 (7 pages).
Non-final rejection for reexamination for Taiwanese Application No. 106119489 dated Oct. 28, 2019 (9 pages).
Written Opinion of the International Searching Authority and International Search Report for PCT Application No. PCT/CN2017/093775 dated Oct. 20, 2017 (14 pages).
International Preliminary Report on Patentability Chapter I for PCT Application No. PCT/CN2017/093775 dated Feb. 14, 2019 (11 pages).
Office Action and Search Report for Taiwanese Application No. 106119489 dated Feb. 20, 2019 (8 pages).
Office Action for Taiwanese Application No. 106119489 dated May 20, 2019 (5 pages).
Office Action for Korean Application No. 10-2019-7006050, dated Feb. 19, 2020, 10 pages.
Notice of Reasons for Rejection for Japanese Application No. 2019-506124, dated Feb. 18, 2020, 5 pages.
Search Report for Taiwanese Application No. 106119489, dated Apr. 9, 2020, 1 page.

* cited by examiner

DATA PROCESSING METHOD AND APPARATUS

CROSS-REFERENCE TO RELATED APPLICATIONS

The present application is a continuation application of International Application No. PCT/CN2017/093775, filed on Jul. 21, 2017, which is based on and claims priority to and benefits of Chinese Patent Application No. 201610630555.3 filed with the State Intellectual Property Office (SIPO) of the People's Republic of China on Aug. 4, 2016. The entire contents of the above-identified applications are incorporated herein by reference.

TECHNICAL FIELD

The present application relates to the technical field of the Internet, particularly to a data processing method and device.

BACKGROUND

With the development of Internet technology, more and more users publish their comments on specific matters through networks, such as a newspaper reporter commenting on a ball game and a financial enthusiast commenting on a stock market.

Many of the articles commenting on a matter are articles predicting the future trend of a matter. Therefore, from these articles, users not only can obtain the summary of the authors on the present situation of a matter but also can know the judgments of the authors on the future development situation of the matter. However, when a user browses some articles that have been published for some time, if the user wants to know whether the prediction of an author is correct or whether the mentioned situation has changed, the user needs to spend a lot of time in searching for the trend chart of the matter commented on by the author on the current website or on other websites, find the point corresponding to the publishing time of the article in the trend chart, and view the subsequent trend situation based on this point, thus determining whether the prediction published by the author is correct or whether the matter has changed since the article was published. The operation is very tedious. Therefore, how to quickly obtain the trend situation of a matter since an article was published while browsing the article is a major difficulty at present.

SUMMARY

In light of the above, embodiments of the specification provides data processing methods and apparatus, which enable a user to quickly obtain the trend situation of a matter since an article is published when the user browses the article. To achieve the above objective, the specification provides the following technical solutions.

In one aspect, the specification provides a data processing method, comprising obtaining, after receiving a link request from a client, a trend chart corresponding to a matter name carried in the link request, wherein the link request is generated after a link in an article is triggered and is used for requesting a trend chart of a matter described in the article, determining a publishing time of the article, annotating information related to the publishing time in the trend chart, and sending the processed trend chart to the client.

In another aspect, the specification provides a data processing apparatus, comprising an obtaining unit, for obtaining, after receiving a link request from a client, a trend chart corresponding to a matter name carried in the link request, wherein the link request is generated after a link in an article is triggered and is used for requesting a trend chart of a matter described in the article, a determining unit, for determining a publishing time of the article, a processing unit, for annotating information related to the publishing time in the trend chart, a sending unit, for sending the processed trend chart to the client.

In a further aspect, the present application provides a data processing method, wherein the method comprises receiving, from a client, a link request associated with a link in an online article, wherein the link request comprises a matter name corresponding to a matter described in the article and a publishing time of the article, obtaining, based on the received link request, a trend chart corresponding to the matter name, wherein the trend chart comprises data associated with the publishing time, annotating information associated with the publishing time in the trend chart, and sending the annotated trend chart to the client for display.

In some embodiments, the annotating the information associated with the publishing time in the trend chart comprises annotating a trend point corresponding to the publishing time in the trend chart.

In some embodiments, the annotating the information associated with the publishing time in the trend chart comprises annotating a degree of difference between a trend point corresponding to the publishing time and a trend point corresponding to a most recent point of time in the trend chart.

In some embodiments, the annotating the information associated with the publishing time in the trend chart comprises modifying an appearance of a portion of the trend chart, the portion corresponding to a time period from the publishing time to a most recent point of time in the trend chart.

In some embodiments, the data processing method further comprises inserting a link to the online article in the trend chart.

In some embodiments, the sending the annotated trend chart to the client for display comprises generating a trend detail page comprising the annotated trend chart and sending the trend detail page to the client for display.

In some embodiments the trend detail page further comprises one or more trend charts that does not comprise data associated with the publishing time. The data processing method further comprises configuring the trend detail page to display the annotated trend chart with priority.

In another further aspect, the present application provides a non-transitory computer-readable storage medium configured with instructions executable by one or more processors to cause the one or more processors to perform operations comprising receiving, from a client, a link request associated with a link in an online article, wherein the link request comprises a matter name corresponding to a matter described in the article and a publishing time of the article, obtaining, based on the received link request, a trend chart corresponding to the matter name, wherein the trend chart comprises data associated with the publishing time, annotating information associated with the publishing time in the trend chart, and sending the annotated trend chart to the client for display.

In yet another aspect, the present application provides a system comprising a processor and a non-transitory computer-readable storage medium storing instructions that, when executed by the processor, cause the system to perform operations comprising receiving, from a client, a link request associated with a link in an online article, wherein the link request comprises a matter name corresponding to a matter described in the article and a publishing time of the article, obtaining, based on the received link request, a trend chart corresponding to the matter name, wherein the trend chart comprises data associated with the publishing time, annotating information associated with the publishing time in the trend chart, and sending the annotated trend chart to the client for display.

By use of the foregoing technical solutions, the data processing method and apparatus provided by the specification can set a link in an article for viewing the trend of a matter. After a server receives a link request sent by a client, it first obtains a trend chart corresponding to a matter name carried in the link request, then obtains the publishing time of the article, and lastly annotates information related to the publishing time in the trend chart, and sends the processed trend chart to the client. Thus it can be seen, compared with current technologies, particular embodiments disclosed herein not only can provide users with a link for viewing the trend chart of a matter, but also can annotate, in the trend chart, information related to the publishing time of an article. Thus when a user browses the article, the user can quickly obtain the trend situation of the matter since the article was published, hence raising the efficiency of the user in analysis of the article.

The foregoing descriptions are only summary of the technical solutions of the present application. In order to more clearly understand the technical means of the present application for implementation according to the content of the specification and to make the foregoing and other objectives, features, and advantages evident and easy to understand, particular embodiments of the present application will now be described below.

BRIEF DESCRIPTION OF THE DRAWINGS

The reading of the following detailed description of the preferred implementation manners will make all other advantages and benefits of the present application evident to those skilled in the art. The accompanying drawings are intended to illustrate the objectives of the preferred implementation manners only and not to limit the present application. In all the accompanying drawings, same reference symbols are used to stand for same components. In the drawings.

DETAILED DESCRIPTION

Below exemplary embodiments of the present disclosure will be described in more detail by referring to accompanying drawings. Although the accompanying drawings display the exemplary embodiments of the present disclosure, it should be understood that the present disclosure may be achieved in various forms and should not be limited by the embodiments described herein. Conversely, the provision of these embodiments is for enabling a clearer understanding of the present disclosure and the complete conveyance of the scope of the present disclosure to those skilled in the art.

Figure 1:
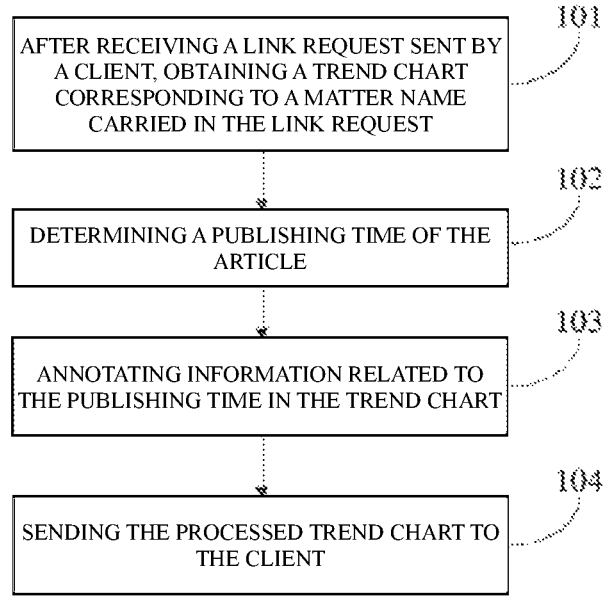
FIG. 1 shows a flow chart of a data processing method according to some embodiments of the specification.

The embodiments of the specification provide a data processing method, which is mainly applied on the server side, as shown in FIG. 1, and mainly comprises:

101. After receiving a link request sent by a client, obtaining a trend chart corresponding to a matter name carried in the link request.

Here, the link request is generated after a link in an article is triggered and is used for requesting a trend chart of a matter described in the article. The matter name may be a stock code, financial product code, sports team code, TV code, and other name codes in various fields. Here, an article containing a TV name may be comments on the audience ratings of a TV channel or TV content, and the corresponding trend chart may be audience ratings trends.

For example, when a user browses an article based on a client, in order to obtain the actual development situation of a matter since the publishing time of the article, the user may click on a link in the article for requesting a trend chart. After the link for requesting the trend chart is triggered, the client may obtain the matter name of a matter to be requested and the publishing time of the article at first, and then send the link request carrying the matter name and publishing time to a server. After the server receives the link request sent by the client, it may obtain the matter name from the link request, and then search in the database for a trend chart corresponding to the matter name so as to proceed to steps 102-103 based on this trend chart subsequently. The trend chart may comprise data associated with the matter name over a particular period of time, which shows a trend related to the corresponding matter.

It should be noted that a matter name may correspond to one or a plurality of trend charts. When a matter name corresponds to a plurality of trend charts, these trend charts may be used to describe the trend situation of a matter in different time periods. For example, there are four trend charts of a stock, namely: a trend chart for the past month, a trend chart for the past three months, a trend chart for the past six months, and a trend chart for the past year.

102. Determining a publishing time of the article.

The above step 101 mentions that after a client becomes aware that a link for requesting a trend chart has been triggered, the client can send a link request carrying the matter name and publishing time to a server. Therefore, after the server receives the link request, it may determine that the time carried in the link request is the publishing time of the article.

Further, a client may obtain the publishing time of an article by the following method: (1) As most articles will indicate the publishing time of the article in the starting part and the ending part, the publishing time may be extracted from the starting part of the article or the ending part of the article. (2) Ordinary URLs (Uniform Resource Locator) will carry a web page creation time, and the web page creation time is the publishing time of the article, so the publishing time may be extracted from the URL of the web page where the article is located.

103. Annotating information related to the publishing time in the trend chart.

If the matter name corresponds to a plurality of trend charts, after a server obtains the trend charts and publishing time of the article, the server may select trend charts containing the publishing time by filtering the obtained trend charts, and then annotate information related to the publishing time in these trend charts respectively so that the subsequent users may intuitively obtain, from the trend charts, information related to the publishing time as well as the trend situation of the matter since the publishing time. Here, information related to the publishing time includes without limitation: a trend point corresponding to the publishing time and the cumulative change in the trend of the matter during a period from the publishing time to a most recent point of time. In annotating the trend chart, the server may modify the appearance of one or more visual features of the trend chart and add or remove information from the trend chart.

104. Sending the processed trend chart to the client.

In actual application, the trend charts corresponding to different time periods may be arranged in a trend detail page, so when trend charts are fed back to a client, the annotated trend charts may be fed back to the client by themselves, or the trend detail page containing the annotated trend charts may be fed back to the client so that the user not only may intuitively view the trend situation of the matter since the publishing time but also may view the trend situations in other time periods.

The data processing method provided by the embodiments of the specification can set a link in an article for viewing the trend of a matter. After a server receives a link request sent by a client, it first obtains a trend chart corresponding to a matter name carried in the link request, then obtains a publishing time of the article, and lastly annotates information related to the publishing time in the trend chart, and sends the processed trend chart to the client. Thus it can be seen, compared with current technologies, particular embodiments disclosed herein not only can provide users with a link for viewing the trend chart of a matter, but also can annotate, in the trend chart, information related to the publishing time of an article. Thus when a user browses the article, the user can quickly obtain the trend situation of the matter since the article was published, hence raising the efficiency of the user in analysis of the article.

Figure 2:
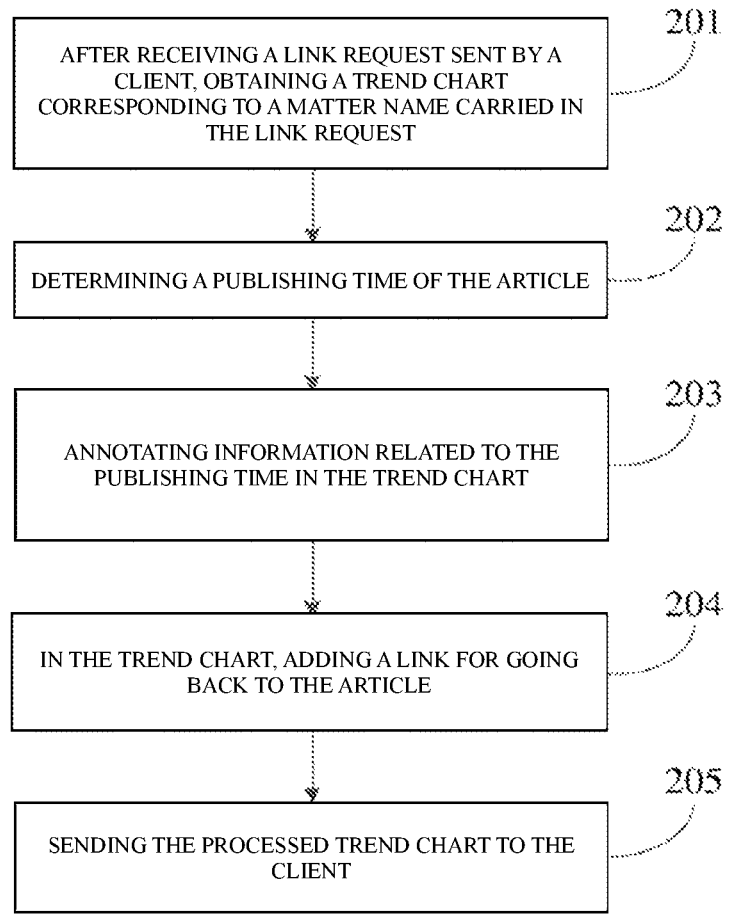
FIG. 2 shows a flow chart of an alternative data processing method according to some embodiments of the specification.

Further, according to the foregoing embodiment, another embodiment of the specification further provides a data processing method, as shown in FIG. 2. The method mainly comprises:

201. After receiving a link request sent by a client, obtaining a trend chart corresponding to a matter name carried in the link request.

202. Determining a publishing time of the article.

203. Annotating information related to the publishing time in the trend chart.

To enable a user, when viewing a trend chart, to intuitively see which coordinate point in the chart is the trend point corresponding to the publishing time, and thus quickly look up, in the trend chart, which part pertains to the trend of a matter since the publishing time of the article, the server may annotate the trend point corresponding to the publishing time in the trend charts that contain the publishing time.

Figure 3:
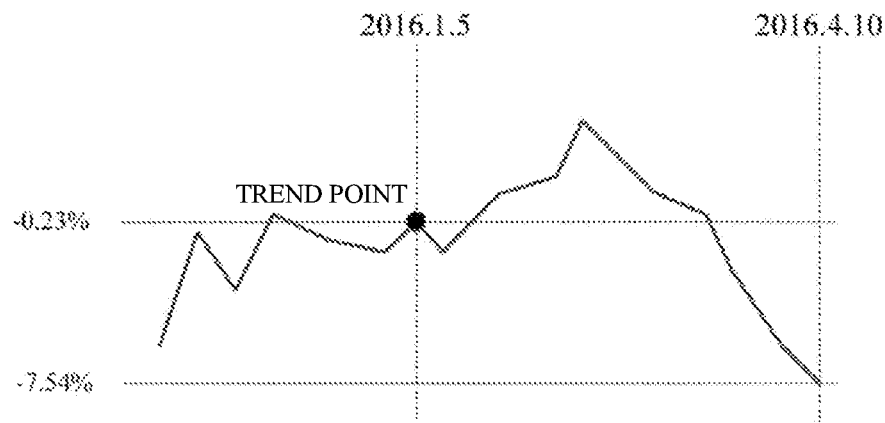
FIG. 3 shows a schematic diagram of a trend chart according to some embodiments of the specification.

As an example, when a user browses an article about comments on fund A on a finance website, the user learns from the article that fund A has been in a constant falling trend recently and the author of the article predicts that fund A will continue to fall. Now, if the user wants to know the actual development situation of fund A since the article was published, the user may click on a link in the article for viewing a trend chart. For example, the link is arranged in the ending part of the article and the name of the link is "Trend Chart of Fund A". Then the server will generate and return a trend detail page to the user, and the trend detail page contains a trend chart as shown in FIG. 3 (or the server only returns the trend chart). From FIG. 3, the user may intuitively know which point the publishing time of the article (i.e., Jan. 5, 2016) corresponds to in the curve, thus quickly obtaining the trend of fund A after Jan. 5, 2016. After checking the trend chart from Jan. 5, 2016 to Apr. 10, 2016, the user may know that fund A was not in a downward trend all the time, but had an ascending period, thus determining that the prediction of the author is not absolutely correct. Hence the user may consider whether to buy fund A.

Further, to enable a user to more intuitively obtain from the trend chart the trend situation of a matter since the publishing time of an article, after the trend point corresponding to the publishing time is found, the curve before the trend point and the curve after the trend point may be processed in a differentiating manner. For example, the curve after the trend point is thickened, colorized, or given a different grayscale so that the user can quickly obtain the trend chart of the matter after the publishing time of the article.

Further, in actual application, a user often needs to know the difference from the publishing time of an article to the latest time, but in order to know the difference between the two, the user first needs to find the trend point corresponding to the publishing time and the trend point corresponding to the most recent point of time in the trend chart, and then needs to calculate the difference value between the two, thus obtaining the difference between the two. The operation is very tedious. Therefore, to enable a user to quickly obtain the difference from the publishing time of an article to the most recent time, this embodiment of the specification makes the following modification to the foregoing solution: the server may first determine the trend point corresponding to the publishing time in the trend chart that contains the publishing time and the trend point corresponding to the most recent point of time in the current trend chart, and then annotate the degree of difference between the trend point corresponding to the publishing time and the trend point corresponding to the most recent point of time in the current trend chart.

Here, the degree of difference may be the difference value obtained by subtracting the trend corresponding to the latest time in the current trend chart from the trend corresponding to the publishing time, or a percentage difference calculated based on the difference value between the two. The degree of difference between the two may be calculated according to other formulae for calculating difference. Further, to enable a user to quickly know whether the cumulative change from the publishing time to the latest time is upwards or downwards, an arrow standing for up or down may be annotated when the degree of difference is annotated.

Figure 4:
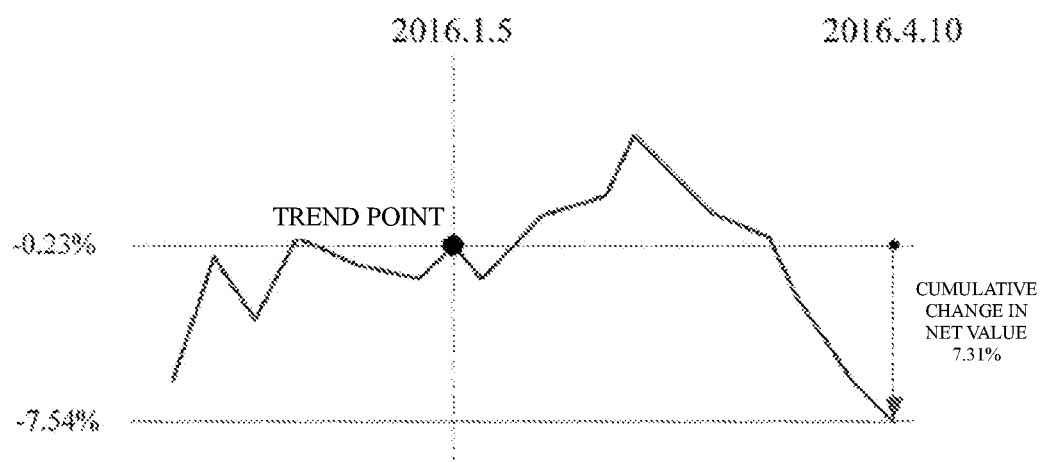
FIG. 4 shows a schematic diagram of an alternative trend chart according to some embodiments of the specification.

For example, if FIG. 3 is changed into FIG. 4, a user can directly and quickly know that the cumulative net value has fallen 7.31% from the publishing time of the article to the present without having to find the net value corresponding to Jan. 5, 2016 and the net value corresponding to Apr. 10, 2016 in the chart first, and then calculate the difference and obtain the change in net value.

204. In the trend chart, adding a link for going back to the article.

In actual application, it often happens that a user closes a previously opened article by accident after the user enters a trend chart or a trend detail page. In this case, if the user wants to return and continue to browse the article, the user needs to re-find this article through site search or search by search engine. It is time consuming. In order to solve the foregoing technical problem, this embodiment of the specification makes the following modification to the foregoing solution: in the trend detail page, the server may add a link for going back to the article in a trend chart containing the publishing time, or may add a link for going back to the article in a trend chart not containing the publishing time, or may add a link for going back to the article in an area of a trend detail page not for a trend chart.

Here, the name of a link for going back to the article may be the title of the article, or may be other text. There is no limitation to its content.

205. Sending the processed trend chart to the client.

The foregoing embodiment mentions that a matter name may correspond to one or a plurality of trend charts. When a matter name corresponds to a plurality of trend charts, these trend charts may be arranged at a trend detail page, and the entire trend detail page is fed back to the client, for the reference of the user if needed. When only some of the trend charts at the trend detail page contain the publishing time, there is the case that information related to the publishing time is annotated in only some of the trend charts. However, in actual application, the trend charts in a trend detail page often are not displayed on the same page, and are viewed by pressing corresponding buttons, and the trend charts displayed first are the trend charts corresponding to a default time period. However, the trend charts that are displayed first by default may be trend charts not containing the publishing time. In this case, when a user wants to view a trend chart containing the publishing time, a corresponding button needs to be pressed in order to display the trend chart. The operation is relatively tedious. In order that the trend charts seen by a user first are processed trend charts (i.e., trend charts containing the publishing time), the following modification may be made based on step 205: the server sends a trend detail page for displaying processed trend charts with priority to the client, i.e., the server first configures or adjusts the page data first displayed in the trend detail page based on annotated trend charts, and then feeds back the adjusted trend detail page to the client so that the user can quickly obtain the trend situation of the matter since the publishing time.

Figure 5:
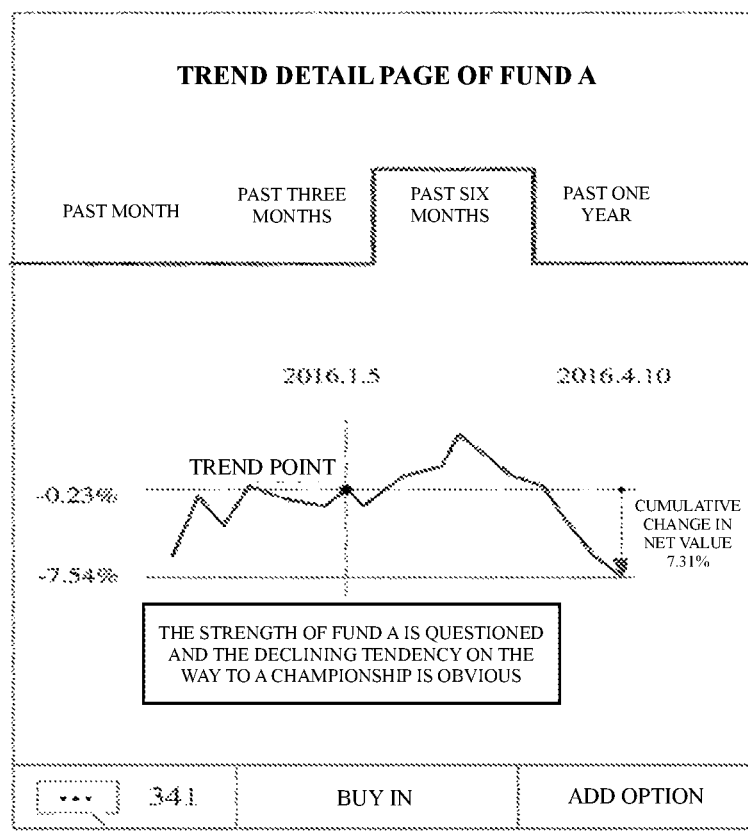
FIG. 5 shows a schematic diagram of a trend detail page according to some embodiments of the specification.

When there are a plurality of trend charts containing the publishing time, any of them may be selected as a trend chart displayed first in the trend detail page, or a trend chart with the shortest time period may be selected as a trend chart displayed first in the trend detail page. There is no limitation to this. For example, if there are a plurality of corresponding trend detail pages in the foregoing example about fund A, the page first displayed to a user may be as shown in FIG. 5, i.e., the trend chart first displayed is an annotated trend chart, rather than a trend chart not annotated and corresponding to time period "past month" at the leftmost of the trend detail page.

Figure 6:
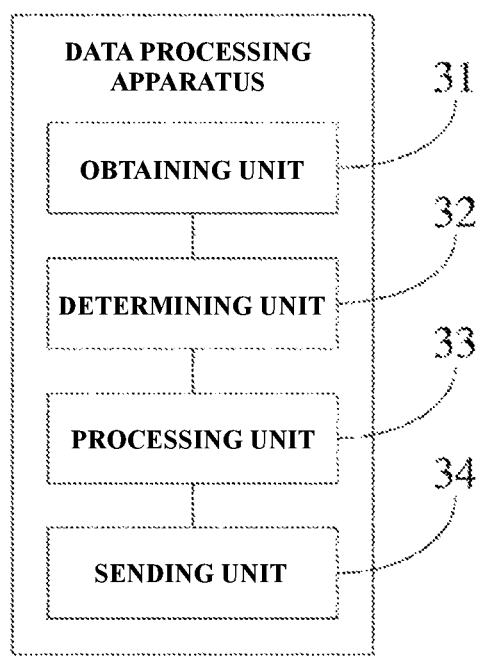
FIG. 6 shows a block diagram of the composition of a data processing apparatus according to some embodiments of the specification.

Further, based on the foregoing method embodiment, another embodiment of the specification further provides a data processing apparatus, as shown in FIG. 6, mainly comprising: an obtaining unit 31, a determining unit 32, a processing unit 33, and a sending unit 34. Here, obtaining unit 31, for obtaining, after receiving a link request sent by a client, a trend chart corresponding to a matter name carried in the link request, wherein the link request is generated after a link in an article is triggered and is used for requesting a trend chart of a matter described in the article;

determining unit 32, for determining a publishing time of the article;

processing unit 33, for annotating information related to the publishing time in the trend chart;

sending unit 34, for sending the processed trend chart to the client.

The data processing apparatus provided by embodiments of the specification can set a link in an article for viewing the trend of a matter. After the server receives a link request sent by a client, it first obtains a trend chart corresponding to a matter name carried in the link request, then obtains a publishing time of the article, and lastly annotates information related to the publishing time in the trend chart, and sends the processed trend chart to the client. Thus it can be seen, compared with current technologies, particular embodiments disclosed herein not only can provide users with a link for viewing the trend chart of a matter, but also can annotate, in the trend chart, information related to the publishing time of an article. Thus when a user browses the article, the user can quickly obtain the trend situation of the matter since the article was published, hence raising the efficiency of the user in analysis of the article.

Figure 7:
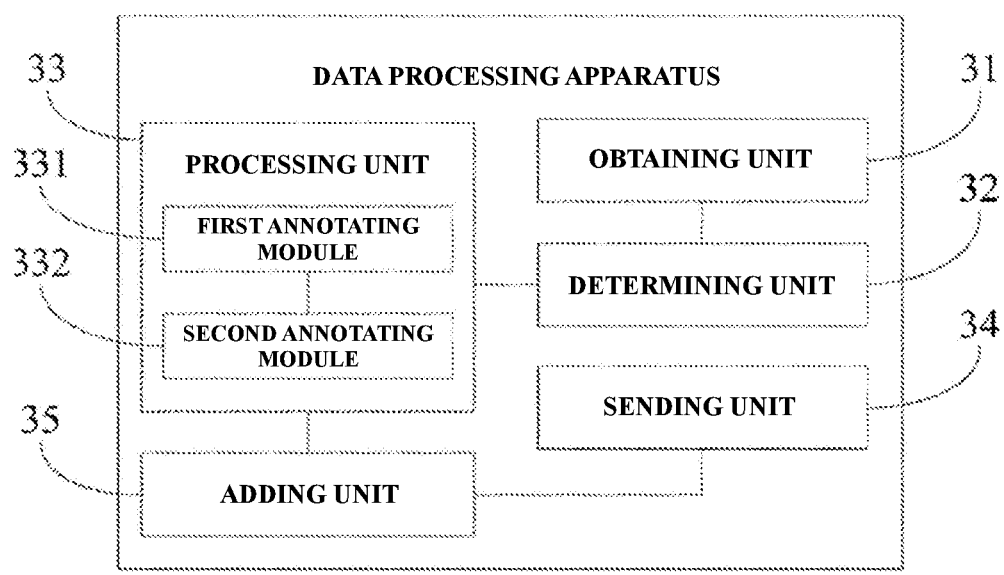
FIG. 7 shows a block diagram of the composition of an alternative data processing apparatus according to some embodiments of the specification.

Further, as shown in FIG. 7, the processing unit 33 comprises:

a first annotating module 331, for annotating a trend point corresponding to the publishing time in the trend chart.

Further, as shown in FIG. 7, the processing unit 33 further comprises:

a second annotating module 332, for annotating a degree of difference between the trend point corresponding to the publishing time and the trend point corresponding to the most recent point of time in the trend chart.

Further, as shown in FIG. 7, the apparatus further comprises:

an adding unit 35, for adding a link for going back to the article in the trend chart after annotation of the information related to the publishing time.

Further, the sending unit 34 is used to send a trend detail page for displaying processed trend charts with priority to the client when trend charts are included in the trend detail page, and the trend charts corresponding to the matter name include trend charts containing the publishing time and trend charts not containing the publishing time.

Of the foregoing embodiments, different embodiments have different emphases of description and the part not described in an embodiment may be seen in relevant descriptions of other embodiments.

It may be understood that the features of the foregoing method and apparatus may be mutually referred to. "First", "second", etc. in the foregoing embodiments are for differentiating the embodiments and do not represent the order of superiority of the embodiments.

Those skilled in the art may clearly understand that for the convenience and concision of description, the working processes of the apparatus and units described above may refer to the corresponding processes in the foregoing method embodiments and will not be described again.

The algorithms and displays provided herein are not inherently correlated to any specific computer, virtual system, or other equipment. Various kinds of general systems may also be used together with the teaching herein. According to the above description, the structure required to constitute such a system is obvious. Further, the specification is not specific to any specific programming language. It should be understood that various programming languages may be used to achieve the content of the specification described herein, and the foregoing description on specific languages is for disclosing optimum implementation manner of particular embodiments of the specification.

The specification provided herein describes many details. However, it can be understood that the embodiments of the specification can be practiced in absence of these details. In some examples, known methods, structures, and technologies are not shown in detail in order not to blur the understanding of this specification.

Similarly, it should be understood that in order to simplify the present disclosure and help understand one or a plurality of aspects, in the foregoing descriptions on exemplary embodiments of the specification, the features of the specification sometimes are grouped to a single embodiment, diagram, or its description. However, the method disclosed should not be interpreted as reflecting the following intention: the subject matter to be protected has more features than the features expressly recorded in every claim. More exactly speaking, as reflected in the following claims, the features the claimed subject matter may include are fewer than all the features of all the individual embodiments disclosed above. Therefore, the claims of implementation manners are hence expressly included in the implementation manner, and every claim per se is a separate embodiment of the specification.

Those skilled in the art may understand that the modules in a device in an embodiment may be subject to adaptive changes and arranged in one or a plurality of devices different from the embodiment. The modules or units or components in an embodiment may be combined into a module, unit, or component, and further, they may be divided into a plurality of submodules, or subunits, or subcomponents. Unless at least some of such features and/or processes or units are mutually exclusive, any combination may be adopted to combine all the features disclosed in the specification (including the accompanying claims, abstract, and drawings) as well as all the processes or units of any method or device thus disclosed. Unless otherwise expressly stated, every feature disclosed in this specification (including the accompanying claims, abstract, and drawings) may be replaced with alternative features providing a same, equivalent or similar object.

Further, those skilled in the art can understand that although some embodiments described herein include some features included in other embodiments but not other features, the combinations of the features of different embodiments mean that they are within the scope of the specification and form different embodiments. For example, in the following claims, any of the embodiments claimed for protection may be used in any combined manner.

The embodiments of the components of the specification may be achieved by hardware, or by a software module operated on one or a plurality of processors, or by their combinations. Those skilled in the art should understand that in practice, microprocessors or digital signal processors (DSP) may be used to achieve some or all of the functions of some or all components of the data processing method and apparatus according to the embodiments of the specification. Particular embodiments of the specification may further achieve some or all device or apparatus programs (such as computer programs and computer program products) for performing the method described herein. Such programs for achieving particular embodiments of the specification may be stored on computer-readable media, or may have a form of one or a plurality of signals. Such signals may be obtained through downloading from the Internet, or provided on carrier signals, or provided in any other form.

It should be noted that the foregoing embodiments are intended to illustrate the embodiments disclosed herein and not to limit the embodiments disclosed herein, and those skilled in the art may design alternative embodiments under the condition of not departing from the scope of the accompanying claims. In claims, no reference symbol between brackets should constitute a limitation to a claim. Word "include" or "comprise" does not exclude the existence of elements or steps not set out in the claims. Word "one" in front of an element does not exclude the existence of a plurality of elements. The embodiments disclosed herein may be achieved with the help of hardware comprising a number of different elements and an appropriately programmed computer. In the claims enumerating several units of the apparatus, the several units may be achieved through a same hardware. The use of words "first", "second", "third", etc. do not stand for any sequence. These words may be interpreted as names.

What is claimed is:

1. A data processing method, comprising:
receiving, from a client, a link request associated with a link in an online article, wherein the link request comprises a matter name corresponding to a matter described in the online article and a publishing time of the article, wherein the publishing time of the article is extracted from an Uniform Resource Locator (URL) associated with the online article;
obtaining, based on the received link request, a trend chart corresponding to the matter name, wherein the trend chart comprises data associated with the publishing time;
annotating the trend chart to indicate the data associated with the publishing time;
adding a link in the annotated trend chart for navigating back to the online article; and
sending the annotated trend chart to the client for display.

2. The method of claim 1, wherein the annotating the trend chart to indicate the data associated with the publishing time comprises:
annotating a trend point corresponding to the publishing time in the trend chart.

3. The method of claim 1, wherein the annotating the trend chart to indicate the data associated with the publishing time comprises:
annotating a degree of difference between a trend point corresponding to the publishing time and a trend point corresponding to a most recent point of time in the trend chart.

4. The method of claim 1, wherein the annotating the information trend chart to indicate the data associated with the publishing time in the trend chart comprises:
modifying an appearance of a portion of the trend chart, the portion corresponding to a time period from the publishing time to a most recent point of time in the trend chart.

5. The method of claim 1, wherein the sending the annotated trend chart to the client for display comprises:
generating a trend detail page comprising the annotated trend chart; and
sending the trend detail page to the client for display.

6. The method of claim 5, wherein the trend detail page further comprises one or more trend charts that does not comprise data associated with the publishing time, and wherein the method further comprises:
configuring the trend detail page to display the annotated trend chart with priority.

7. A non-transitory computer-readable storage medium configured with instructions executable by one or more processors to cause the one or more processors to perform operations comprising:

receiving, from a client, a link request associated with a link in an online article, wherein the link request comprises a matter name corresponding to a matter described in the online article and a publishing time of the article, wherein the publishing time of the article is extracted from an Uniform Resource Locator (URL) associated with the online article;

obtaining, based on the received link request, a trend chart corresponding to the matter name, wherein the trend chart comprises data associated with the publishing time;

annotating the trend chart to indicate the data associated with the publishing time;

adding a link in the annotated trend chart for navigating back to the online article; and sending the annotated trend chart to the client for display.

8. The non-transitory computer-readable storage medium of claim 7, wherein the annotating the trend chart to indicate the data associated with the publishing time comprises:

annotating a trend point corresponding to the publishing time in the trend chart.

9. The non-transitory computer-readable storage medium of claim 7, wherein the annotating the trend chart to indicate the data associated with the publishing time comprises:

annotating a degree of difference between a trend point corresponding to the publishing time and a trend point corresponding to a most recent point of time in the trend chart.

10. The non-transitory computer-readable storage medium of claim 7, wherein the annotating the trend chart to indicate the data associated with the publishing time comprises:

modifying an appearance of a portion of the trend chart, the portion corresponding to a time period from the publishing time to a most recent point of time in the trend chart.

11. The non-transitory computer-readable storage medium of claim 7, wherein the sending the annotated trend chart to the client for display comprises:

generating a trend detail page comprising the annotated trend chart; and sending the trend detail page to the client for display.

12. The non-transitory computer-readable storage medium of claim 11, wherein the trend detail page further comprises one or more trend charts that does not comprise data associated with the publishing time, and wherein the operations further comprises:

configuring the trend detail page to display the annotated trend chart with priority.

13. A system comprising a processor and a non-transitory computer-readable storage medium storing instructions executable by the processor to cause the system to perform operations comprising:

receiving, from a client, a link request associated with a link in an online article, wherein the link request comprises a matter name corresponding to a matter described in the online article and a publishing time of the article, wherein the publishing time of the article is extracted from an Uniform Resource Locator (URL) associated with the online article;

obtaining, based on the received link request, a trend chart corresponding to the matter name, wherein the trend chart comprises data associated with the publishing time;

annotating the trend chart to indicate the data associated with the publishing time;

adding a link in the annotated trend chart for navigating back to the online article; and sending the annotated trend chart to the client for display.

14. The system of claim 13, wherein the annotating the trend chart to indicate the data associated with the publishing time comprises:

annotating a trend point corresponding to the publishing time in the trend chart.

15. The system of claim 13, wherein the annotating the trend chart to indicate the data associated with the publishing time comprises:

annotating a degree of difference between a trend point corresponding to the publishing time and a trend point corresponding to a most recent point of time in the trend chart.

16. The system of claim 13, wherein the annotating the trend chart to indicate the data associated with the publishing time comprises:

modifying an appearance of a portion of the trend chart, the portion corresponding to a time period from the publishing time to a most recent point of time in the trend chart.

17. The system of claim 13, wherein the sending the annotated trend chart to the client for display comprises:

generating a trend detail page comprising the annotated trend chart; and sending the trend detail page to the client for display.

18. The system of claim 17, wherein the trend detail page further comprises one or more trend charts that does not comprise data associated with the publishing time, and wherein the operations further comprises:

configuring the trend detail page to display the annotated trend chart with priority.

* * * * *

UNITED STATES PATENT AND TRADEMARK OFFICE
CERTIFICATE OF CORRECTION

PATENT NO. : 10,878,054 B2
APPLICATION NO. : 16/260849
DATED : December 29, 2020
INVENTOR(S) : Shaoyun Wu It is certified that error appears in the above-identified patent and that said Letters Patent is hereby corrected as shown below:

In the Claims

Claim 4, Column 10, Lines 51-52:
"annotating the information trend chart to indicate the data associated with the publishing time in the trend chart comprises:" should read -- annotating the trend chart to indicate the data associated with the publishing time comprises: --.

Signed and Sealed this
Fifth Day of September, 2023

Katherine Kelly Vidal
Director of the United States Patent and Trademark Office